US009860701B1

(12) United States Patent
Fang et al.

(10) Patent No.: US 9,860,701 B1
(45) Date of Patent: Jan. 2, 2018

(54) INDOOR POSITIONING SYSTEM AND METHOD THEREOF

(71) Applicant: Quanta Computer Inc., Taoyuan (TW)

(72) Inventors: Tien-Chin Fang, Taoyuan (TW);
Chen-Chung Lee, Taoyuan (TW);
Chih-Ling Liu, Taoyuan (TW);
Ching-Wen Lin, Taoyuan (TW);
Ming-Jen Chen, Taoyuan (TW);
Chia-Hung Lin, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 0 days.

(21) Appl. No.: 15/293,588

(22) Filed: Oct. 14, 2016

(30) Foreign Application Priority Data

Jul. 4, 2016 (TW) .............................. 105121065 A

(51) Int. Cl.
*H04W 4/00* (2009.01)
*H04W 4/02* (2009.01)
*H04W 4/04* (2009.01)

(52) U.S. Cl.
CPC ........... *H04W 4/023* (2013.01); *H04W 4/008* (2013.01); *H04W 4/043* (2013.01)

(58) Field of Classification Search
CPC ... H04W 64/00; H04W 4/008; H04W 40/244; H04W 4/021; H04W 4/043
See application file for complete search history.

(56) References Cited

U.S. PATENT DOCUMENTS

| 8,400,359 | B2 | 3/2013 | Liu et al. |
| 2015/0369618 | A1* | 12/2015 | Barnard ............. H05B 37/0272 701/491 |

FOREIGN PATENT DOCUMENTS

TW 201115170 A1 5/2011

OTHER PUBLICATIONS

Mobile Indoor Positioning Using Wi-Fi Localization Bianca Bobescu, Marian Alexandru.*
Bluetooth Triangulator Varun Almaula Department of Computer Science and Engineering University of California, San Diago La Jolla, CA 92093.*

(Continued)

*Primary Examiner* — Nizar Sivji
(74) *Attorney, Agent, or Firm* — McClure, Qualey & Rodack, LLP

(57) ABSTRACT

An indoor positioning method for use in an indoor positioning system is provided. The indoor positioning system includes beacon devices, a mobile device, and a positioning server. The method includes the steps of: utilizing the mobile device to receive a positioning signal from each beacon device and determine distance information between the mobile device and each beacon device; determining a specific primary region in which the mobile device is located according to the distance information between the mobile device and the top beacon devices; determining a precise location in the specific primary region according to the distance information between the mobile device and the planar beacon devices corresponding to the specific primary region; and reporting the precise location to the mobile device, so that the precise location is illustrated on a plan view of the indoor space displayed on the mobile device.

8 Claims, 4 Drawing Sheets

(56) References Cited

OTHER PUBLICATIONS

Luxapose: Indoor Postioning with Mobile Phones and Visible Light; Ye-Sheng Kuo, Pat Pannuto, Ko-Jen Hsiao, and Prabal Dutta; Electrical Engineering and Computer Science Department; University of Michigan; Ann Arbor, MI 48109 {samkuo,ppannuto,coolmark,prabal}@umich.edu Dated Sep. 7-11, 2014.*

Chinese language office action dated Apr. 5, 2017, issued in application No. TW 105121065.

* cited by examiner

INDOOR POSITIONING SYSTEM AND METHOD THEREOF

CROSS REFERENCE TO RELATED APPLICATIONS

This Application claims priority of Taiwan Patent Application No. 105121065, filed on Jul. 4, 2016, the entirety of which is incorporated by reference herein.

BACKGROUND OF THE INVENTION

Field of the Invention

The invention relates to positioning systems, and, in particular, to a beacon-assisted indoor positioning system and an associated indoor positioning method thereof.

Description of the Related Art

With recent advances in technology, a mobile device is usually equipped with a global positioning system (GPS) that is capable of performing outdoor positioning with satellites. However, since the strength of the wireless signal of the GPS is relatively weak, the GPS is usually not functional while the user is located in an indoor space. Thus, the GPS cannot perform precise positioning of the user's mobile device for the indoor space such as an office, a classroom, or a mall.

Accordingly, there is demand for an indoor positioning system and an associated indoor positioning method thereof for performing precise indoor positioning.

BRIEF SUMMARY OF THE INVENTION

A detailed description is given in the following embodiments with reference to the accompanying drawings.

In an exemplary embodiment, an indoor positioning system is provided. The indoor positioning system includes: a plurality of beacon devices, a mobile device, and a positioning server. The beacon devices includes a plurality of top beacon devices and a plurality of planar beacon devices, wherein each top beacon device is deployed on the ceiling of a corresponding primary region of an indoor space, and the planar beacon devices are deployed in the surroundings of each primary region. The mobile device is used for executing an indoor positioning application to receive a positioning signal from each beacon device and determining distance information between the mobile device and each beacon device. The positioning server is used for receiving the distance information between the mobile device and each beacon device from the mobile device and determining a primary region in the indoor space in which the mobile device is located according to the received distance information. The positioning server further determines the precise location of the mobile device according to the distance information between the mobile device and the planar beacon devices corresponding to the specific primary region. The positioning server reports the determined precise location to the mobile device, so that the indoor positioning application running on the mobile device illustrates the precise location of the mobile device on a plan view of the indoor space.

In another exemplary embodiment, an indoor positioning method for use in an indoor positioning system is provided. The indoor positioning system comprises a plurality of beacon devices, a mobile device, and a positioning server. The beacon devices comprises a plurality of top beacon devices and a plurality of planar beacon devices, wherein each top beacon device is deployed on the ceiling of a corresponding primary region of an indoor space, and the planar beacon devices are deployed in the surroundings of each primary region. The method includes the steps of: utilizing the mobile device to execute an indoor positioning application to receive a positioning signal from each beacon device and to determine distance information between the mobile device and each beacon device; utilizing the positioning server to receive the distance information from the mobile device; utilizing the positioning server to determine the specific primary region in which the mobile device is located according to the distance information between the mobile device and the top beacon devices; utilizing the positioning server to determine the precise location in the specific primary region according to the distance information between the mobile device and the planar beacon devices corresponding to the specific primary region; and utilizing the positioning server to report the precise location to the mobile device, so that the indoor positioning application running on the mobile device illustrates the precise location of the mobile device on a plan view of the indoor space.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
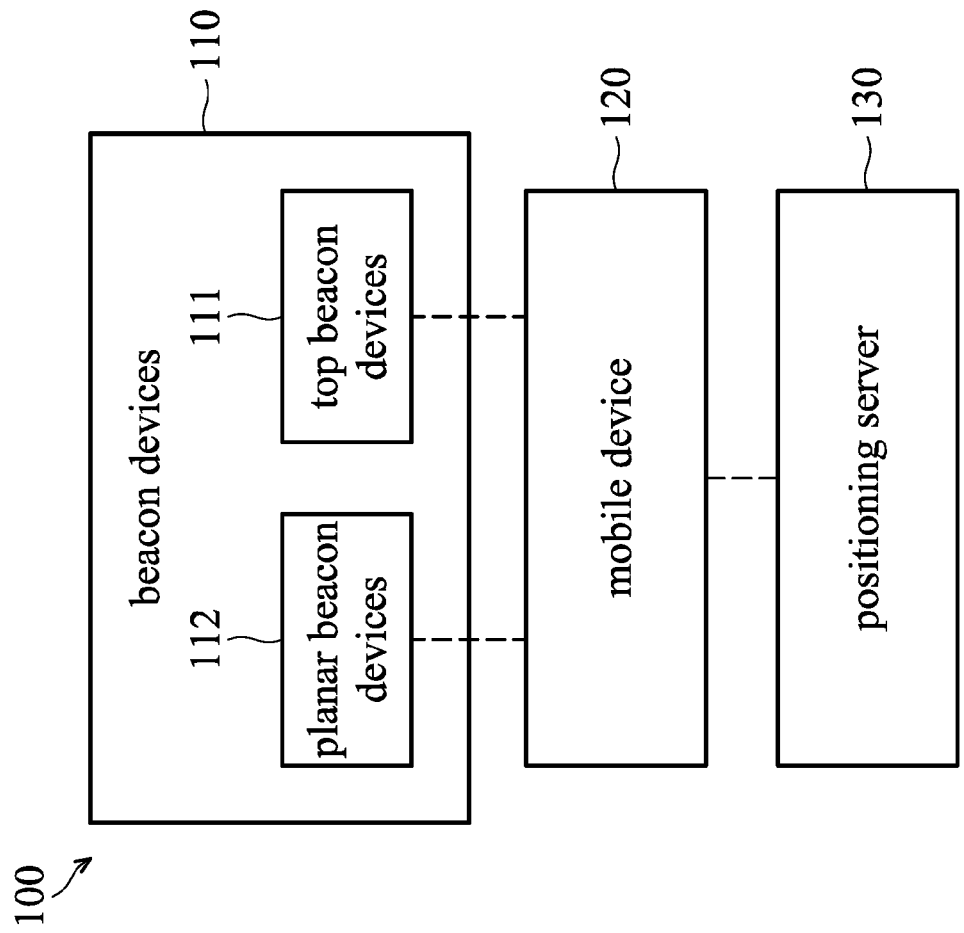
FIG. 1 is a block diagram of a cloud video system in accordance with an embodiment of the invention.

FIG. 1 is a block diagram of an indoor positioning system in accordance with an embodiment of the invention.

In an embodiment, the indoor positioning system includes a plurality of beacon devices 110, a mobile device 120, and a positioning server 130. For example, each beacon device 110 can be disposed at an individual position in an indoor space such as an office, a classroom, a theater, a stadium, etc., but the invention is not limited thereto. In addition, each beacon device 110 may advertise a positioning signal associated with the beacon device 110 thereof using a wireless communication protocol. For example, each beacon device 110 may advertise the positioning signal every second using a wireless communication protocol such as Bluetooth Low Energy (BLE), Wifi, or infrared ray (IR), but the invention is not limited thereto. For the purposes of description, the BLE protocol is used in the following embodiments.

A mobile device 120 such as a smartphone, a tablet PC, or a laptop is carried by the user, but the invention is not limited thereto. When the user carries the mobile device and enters an indoor space in which the beacon devices 110 are deployed, the user may activate a specific indoor positioning application on the mobile device 120, and thus a transceiver (not shown in FIG. 1) on the mobile device 120 may receive the advertised positioning signal from each beacon device 110. For example, if the BLE protocol is used, the mobile device 120 may receive the advertised positioning signal from each beacon device within a distance range (e.g. about 5~10 meters, non-directional, and depending on the power of each beacon device 110).

Specifically, the specific indoor positioning application running on the mobile device 120 includes a program code that is capable of converting the strength of the advertised positioning signal to a corresponding distance. For example, the program code can be implemented by a software development kit (SDK), but the invention is not limited thereto. It should be noted that the estimated distance by the conversion may be inaccurate only based on the signal strength from a specific beacon device because there might be an obstacle between the specific beacon device and the mobile device 120, resulting in weak signal strength.

The positioning server 130, for example, may be a personal computer, a dedicated server, or another computing device that is capable of performing positioning calculations, but the invention is not limited thereto. For example, the positioning server 130 may retrieve distance information between the mobile device 120 and each beacon device from the mobile device 120 via a wireless network, thereby determining the position of the mobile device 120 in the indoor space.

In an embodiment, the beacon device 110 can be classified into two categories such as top beacon devices 111 and planar beacon devices 112. The top beacon devices 111 are disposed on the ceiling of the indoor space according to a predetermined arrangement, thereby defining the predetermined primary regions in the indoor space. Since the top beacon devices 111 are disposed on the ceiling of the indoor space, there should be no obstacles between the mobile device 120 and the top beacon devices, and thus the predetermined primary region in which the mobile device 120 is located can be determined more precisely. The planar beacon devices 112 are disposed or affixed to the surrounding walls or objects of each predetermined primary region, thereby defining the sub-regions in each predetermined primary region. Details for indoor positioning will be described in the following embodiments.

Figure 2:
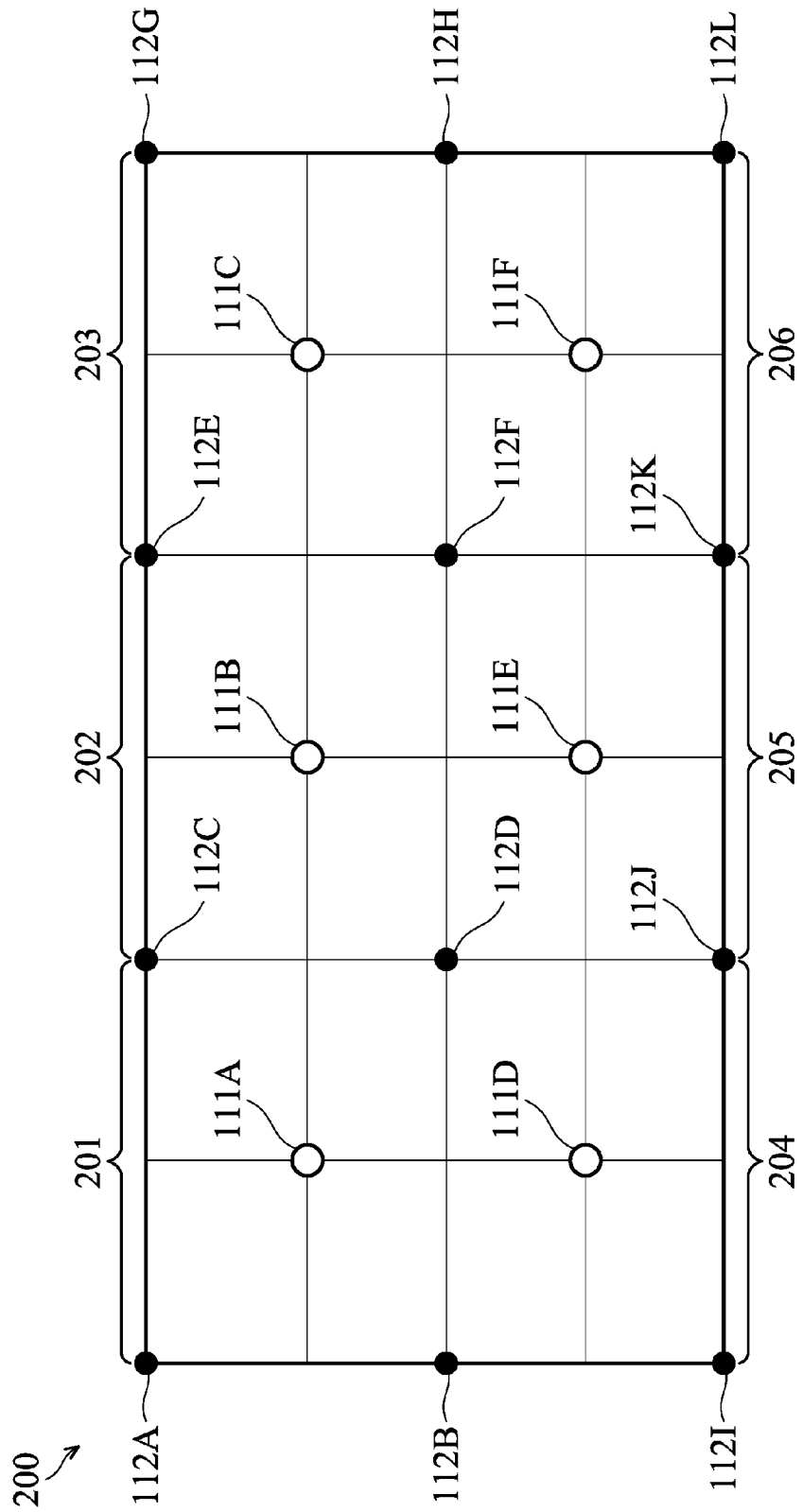
FIG. 2 is a top view of an indoor space in accordance with an embodiment of the invention.

FIG. 2 is a top view of an indoor space in accordance with an embodiment of the invention. Referring to both FIG. 1 and FIG. 2, the top beacon devices 111 include top beacon devices 111A~111F that are disposed on the ceiling of the indoor space 200 according to a predetermined arrangement, and each of the top beacon devices 111A~111F corresponds to a predetermined primary region in the indoor space 200 such as primary regions 201~206. For the purposes of description, the primary regions 201~206 are illustrated as rectangles, and the user may adjust the arrangement of the top beacon devices and planar beacon devices according to practical application.

The planar beacon devices 112 include planar beacon devices 112A~112L. For example, each of the primary regions 201~206 has four corresponding planar beacon devices. The primary region 201 is equipped with planar beacon devices 112A, 112B, 112C, and 112D in addition to the top beacon device 111A. The primary region 202 is equipped with planar beacon devices 112C, 112D, 112E, and 112F in addition to the top beacon device 111B. The arrangement of the top beacon device and planar beacon devices are similar to that in the primary regions 201 and 202, and thus the details will be omitted here. Since the primary regions 201 and 202 are adjacent and the advertised positioning signal of each planar beacon device is non-directional, the planar beacon devices 112C and 112D on the common edge of the primary regions 201 and 202 can be shared.

Figure 3:
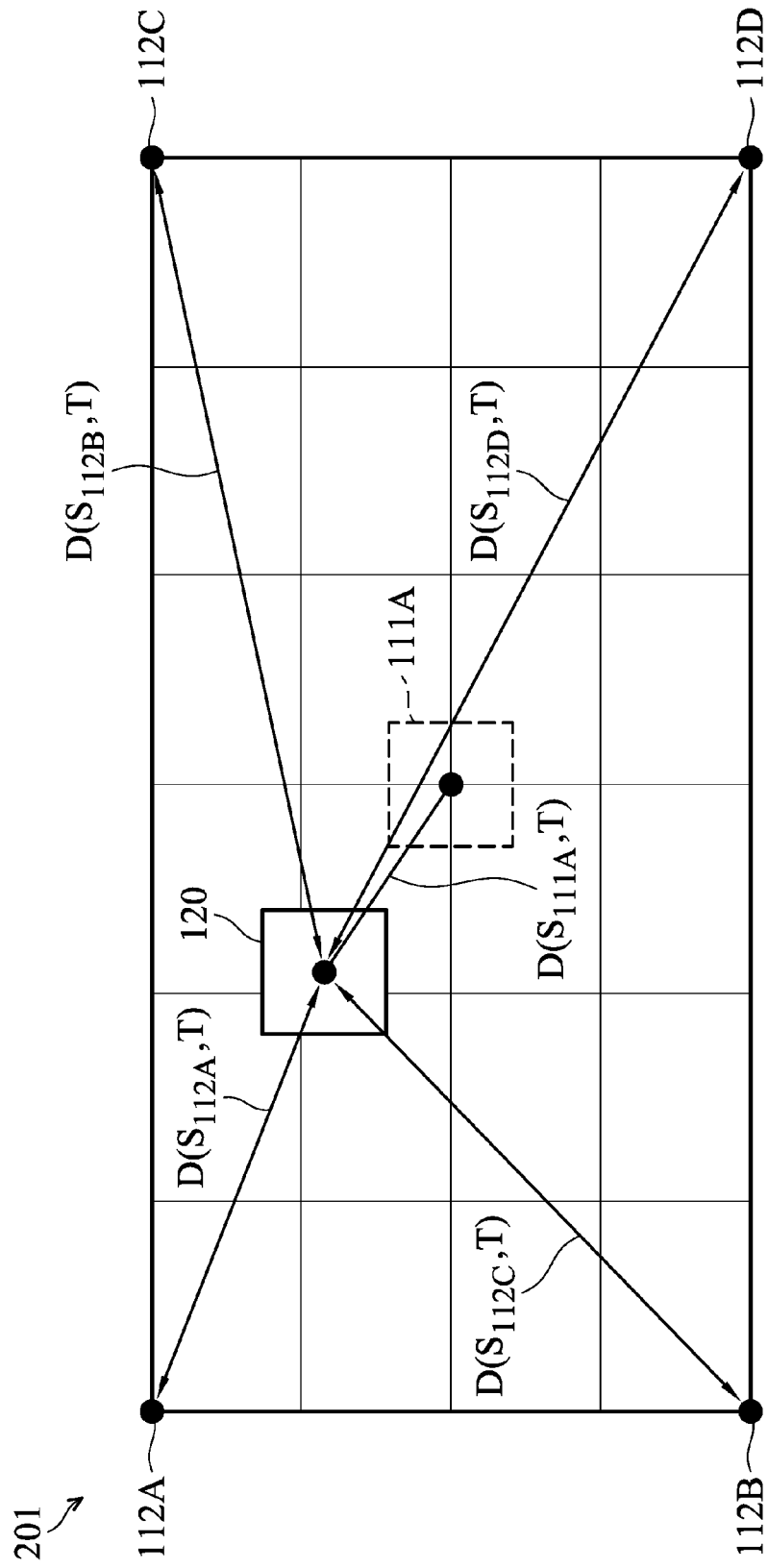
FIG. 3 is a diagram of indoor positioning in the primary region 201 in accordance with the embodiment of FIG. 2.

FIG. 3 is a diagram of indoor positioning in the primary region 201 in accordance with the embodiment of FIG. 2.

The arrangement of beacon devices in the primary region 201 is shown in FIG. 3. If the mobile device 120 is located in the primary region 201, the mobile device 120 may receive the advertised positioning signal from the beacon devices 111A and 112A~112D. The indoor positioning application running on the mobile device 120 may convert the signal strength of the received positioning signal from each beacon device into a corresponding distance, and the aforementioned distance is a function of the signal strength of the positioning signal and time. For example, the distance function between the mobile device 120 and the top beacon device 111A can be expressed as $D(S_{111A}, T)$, and the distance function between the mobile device 120 and the planar beacon device 112A can be expressed as $D(S_{111A}, T)$, wherein S111A and S112 denote the respective estimated signal strengths of the positioning signals from the top beacon device 111A and planar beacon device 112A at time T. Similarly, the distance functions between the mobile device 120 and the planar beacon devices 112B~112D can be expressed as $D(S_{112B}, T)$, $D(S_{112C}, T)$, and $D(S_{112D}, T)$, respectively. S112B, S112C, and S112D denote respective estimated signal strengths of the positioning signals from planar beacon devices 112B, 112C, and 112D at time T. It should be noted that the estimated signal strength of the positioning signal from each beacon device may vary at different times even if the mobile device 120 is stationary, and the estimated signal strength of the positioning signal from each beacon device is based on the signal stability, obstacles between the mobile device and each beacon device, or other interference.

Specifically, the indoor positioning application running on the mobile device 120 may transmit the corresponding distance that is converted from the signal strength to the positioning server 130 via a wireless network, and the positioning server 130 may calculate the position of the mobile device 120 in the indoor space 200 according to the corresponding distance between the mobile device and each beacon device.

For example, the mobile device 120 transmits the corresponding distance between the mobile device 120 and each beacon device to the positioning server 130. Since the distance between the mobile device 120 and the top beacon device 111A is the shortest among the beacon devices, the positioning server 130 may determine that the mobile device 120 is located in the primary region 201. Then, the positioning server 130 may further determine the precise location of the mobile device 120 in the primary region 201. Specifically, because the mobile device 120 is located in the primary region 201, the mobile device 120 is capable of simultaneously receiving the positioning signals from the planar beacon devices 112A-112D without any obstacles. Accordingly, the positioning server 130 may determine the location of the mobile device 120 in the primary region 210 according to the corresponding distance between the mobile device 120 and each of the planar beacon devices 112A-112D in the primary region 210.

In addition, when the positioning server 130 has determined the relative position of the mobile device 120 in the primary region 201, the positioning server 130 may perform a precise calibration of the location of the mobile device 120. For example, in a special situation wherein the mobile device 120 is located directly below the top beacon device 111A, the positioning server 130 may determine that the corresponding distances between the mobile device 120 and the planar beacon devices 112A-112D are equal. In this special situation, the positioning server 130 may further determine whether the distances between the mobile device 120 and the planar beacon devices 112A-112D are longer than the distance between the mobile device 120 and the top beacon device 111A in the primary region 201. If so, the positioning server 130 may determine that the mobile device 120 is located at the center of the primary region 201. Otherwise, the positioning server 130 may determine that the previously determined location of the mobile device 120 is faulty.

In an embodiment, the indoor positioning application may illustrate a detailed plan view of the indoor space 200, such as seat numbers, IDs of users, and/or employee numbers. When the positioning server 130 has determined the position of the mobile device 120 according to the corresponding distance between the mobile device 120 and each of the planar beacon devices 112A~112D, the positioning server 130 may transmit the determined location to the mobile device 120 via a wireless network. Then, the user may know the current position of the mobile device 120 from the plan view illustrated by the indoor positioning application.

It should be noted that the positioning server 130 is capable of managing positioning in various indoor spaces. For example, the positioning server 130 includes a database for recording metadata including a plan view of each predetermined indoor space and location information of the beacon devices that are deployed in the predetermined indoor spaces, thereby supporting calculations of precise positioning.

In some embodiments, the indoor positioning application running on the mobile device 120 may replace the function of the positioning server 130. That is, the determination of the location of the mobile device 120 in the indoor space and the illustration of the determined location of the mobile device 120 in the indoor space are performed by the mobile device 120 itself.

Figure 4:
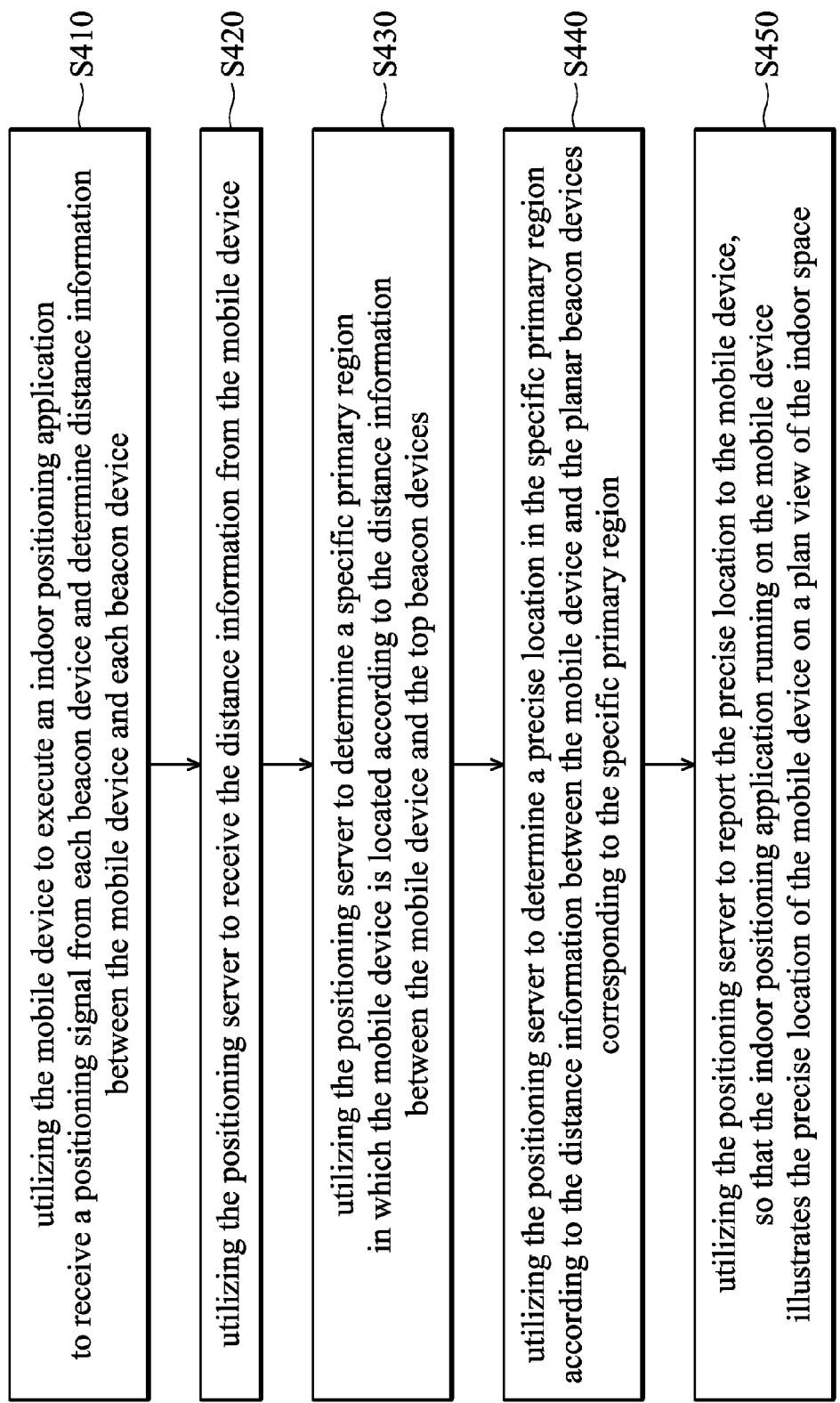
FIG. 4 is a flow chart of an indoor positioning method in accordance with an embodiment of the invention.

FIG. 4 is a flow chart of an indoor positioning method in accordance with an embodiment of the invention. In step S410, the mobile device is utilized to perform an indoor positioning application to receive a positioning signal corresponding to each beacon device and determining distance information between the mobile device and each beacon device.

In step S420, the positioning server is utilized to receive the distance information between the mobile device and each beacon device.

In step S430, the positioning server is utilized to determine a specific primary region of the indoor space according to the distance information between the mobile device and each top beacon device.

In step S440, the positioning server is utilized to determine a precise position of the mobile device in the specific primary region according to the distance information corresponding to the planar beacon devices in the specific primary region.

In step S450, the positioning server is utilized to report the precise position to the mobile device, so that the indoor positioning application running on the mobile device illustrates the precise position of the mobile device on a plan view of the indoor space that is displayed on the screen of the mobile device.

While the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An indoor positioning system, comprising: a plurality of beacon devices, comprising a plurality of top beacon devices and a plurality of planar beacon devices, wherein each top beacon device is deployed on a ceiling of a corresponding primary region of an indoor space, and the planar beacon devices are deployed in the surroundings of each primary region;

a mobile device, for executing an indoor positioning application to receive a positioning signal from each beacon device and determining distance information between the mobile device and each beacon device; and a positioning server, for receiving the distance information between the mobile device and each beacon device from the mobile device and determining a primary region in the indoor space in which the mobile device is located according to the received distance information, wherein the positioning server further determines a precise location of the mobile device according to the distance information between the mobile device and the planar beacon devices corresponding to the specific primary region, and the positioning server further reports the determined precise location to the mobile device, so that the indoor positioning application running on the mobile device illustrates the precise location of the mobile device on a plan view of the indoor space, wherein after the positioning server has determined the precise location of the mobile device in the specific primary region, if the positioning server further determines that the distances from the planar beacon devices corresponding to the specific primary region to the mobile device are equal the positioning server further determines whether the distances from the planar beacon devices in the specific primary region to the mobile device are longer than the distance from the mobile device to the top beacon device corresponding to the specific primary region, if so, the positioning server determines that the mobile device is located at the center of the specific primary region;

if not, the positioning server determines that the precise location of the mobile device is faulty.

2. The indoor positioning system as claimed in claim 1, wherein the beacon devices support the Bluetooth Low Energy (BLE) protocol.

3. The indoor positioning system as claimed in claim 1, wherein the positioning server determines one of the top beacon devices that has the shortest distance to the mobile device to correspond to the specific primary region.

4. The indoor positioning system as claimed in claim 1, wherein the indoor positioning application comprises a program code that converts signal strength of the positioning signal from each beacon device to corresponding distance information.

5. An indoor positioning method for use in an indoor positioning system, wherein the indoor positioning system comprises a plurality of beacon devices, a mobile device, and a positioning server, and the plurality of beacon devices comprises a plurality of top beacon devices and a plurality of planar beacon devices, wherein each top beacon device is deployed on a ceiling of a corresponding primary region of an indoor space, and the planar beacon devices are deployed in the surroundings of each primary region, the method comprising:
    utilizing the mobile device to execute an indoor positioning application to receive a positioning signal from each beacon device and determine distance information between the mobile device and each beacon device;
    utilizing the positioning server to receive the distance information from the mobile device;
    utilizing the positioning server to determine a specific primary region in which the mobile device is located according to the distance information between the mobile device and the top beacon devices;
    utilizing the positioning server to determine a precise location in the specific primary region according to the distance information between the mobile device and the planar beacon devices corresponding to the specific primary region; and
    utilizing the positioning server to report the precise location to the mobile device, so that the indoor positioning application running on the mobile device illustrates the precise location of the mobile device on a plan view of the indoor space;

wherein after the positioning server has determined the precise location of the mobile device in the specific primary region, the method further comprises:
    if it is determined that the distances from the planar beacon devices corresponding to the specific primary region to the mobile device are equal determining whether the distance from the planar beacon devices in the specific primary region to the mobile device is longer than the distance from the mobile device to the top beacon device corresponding to the specific primary region,
    if so, determining that the mobile device is located at the center of the specific primary region;
    if not, determining that the precise location of the mobile device is faulty.

6. The indoor positioning method as claimed in claim 5, wherein the beacon devices support the Bluetooth Low Energy (BLE) protocol.

7. The indoor positioning method as claimed in claim 5, further comprising:
    determining one of the top beacon devices that has the shortest distance to the mobile device to correspond to the specific primary region.

8. The indoor positioning method as claimed in claim 5, wherein the indoor positioning application comprises a program code that converts signal strength of the positioning signal from each beacon device to corresponding distance information.

* * * * *